(12) United States Patent
Onda et al.

(10) Patent No.: US 6,404,515 B1
(45) Date of Patent: *Jun. 11, 2002

(54) IMAGE READING APPARATUS

(75) Inventors: Yoshinari Onda, Kawasaki; Toshiki Ishino, Yokohama, both of (JP)

(73) Assignee: Canon Kubushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/963,170

(22) Filed: Nov. 3, 1997

(30) Foreign Application Priority Data

Nov. 8, 1996 (JP) ............................................. 8-296466

(51) Int. Cl.$^7$ ................................................. H04N 1/04
(52) U.S. Cl. ......................... 358/474; 358/484; 382/312
(58) Field of Search ................................. 358/487, 494, 358/497, 496, 498, 474; 353/101; 352/140; 382/312

(56) References Cited

U.S. PATENT DOCUMENTS

| | | | | |
|---|---|---|---|---|
| 4,560,863 A | * | 12/1985 | Matsumura | 250/201 |
| 4,624,555 A | * | 11/1986 | Tokuhara | 355/71 |
| 5,210,591 A | * | 5/1993 | DeGroot | 356/357 |
| 5,394,205 A | * | 2/1995 | Ochiai | 353/101 |
| 5,414,535 A | * | 5/1995 | Kanmoto et al. | 358/487 |
| 5,580,162 A | * | 12/1996 | Murakami | 362/268 |
| 5,751,451 A | * | 5/1998 | Ogoshi et al. | 358/487 |
| 5,754,314 A | * | 5/1998 | Araki et al. | 358/487 |
| 5,767,990 A | * | 6/1998 | Ikeda | 358/487 |
| 5,808,757 A | * | 9/1998 | Ikeda | 358/498 |
| 5,828,439 A | * | 10/1998 | Ueno | 351/205 |

* cited by examiner

Primary Examiner—Jerome Grant, II
(74) Attorney, Agent, or Firm—Robin, Blecker & Daley

(57) ABSTRACT

In an image reading apparatus, a sensor box to which a lens and an image sensor are fixed is moved with respect to a film original, so that focus adjustment can be reliably performed in reading an image recorded on any of film originals of different formats such as a sleeve-shaped film, a slide-mount film, a roll-shaped long film, etc.

13 Claims, 16 Drawing Sheets

FIG. 7(a)
FIG. 7(b)
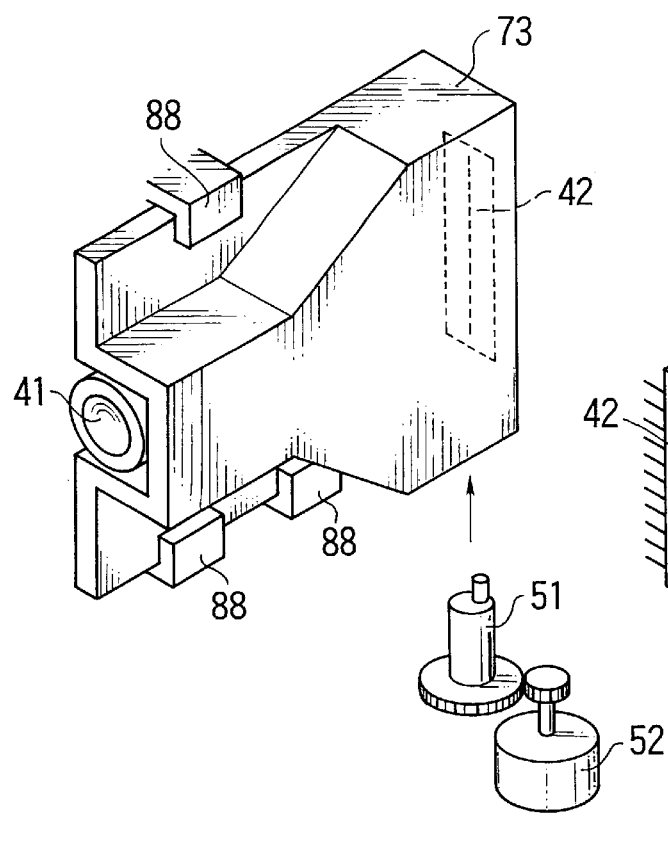
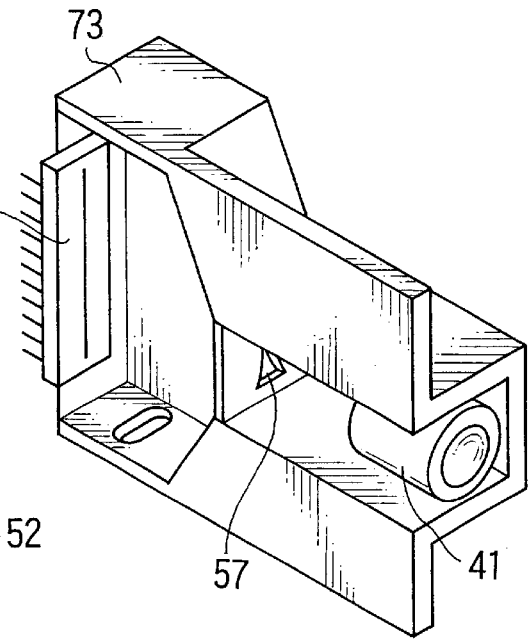

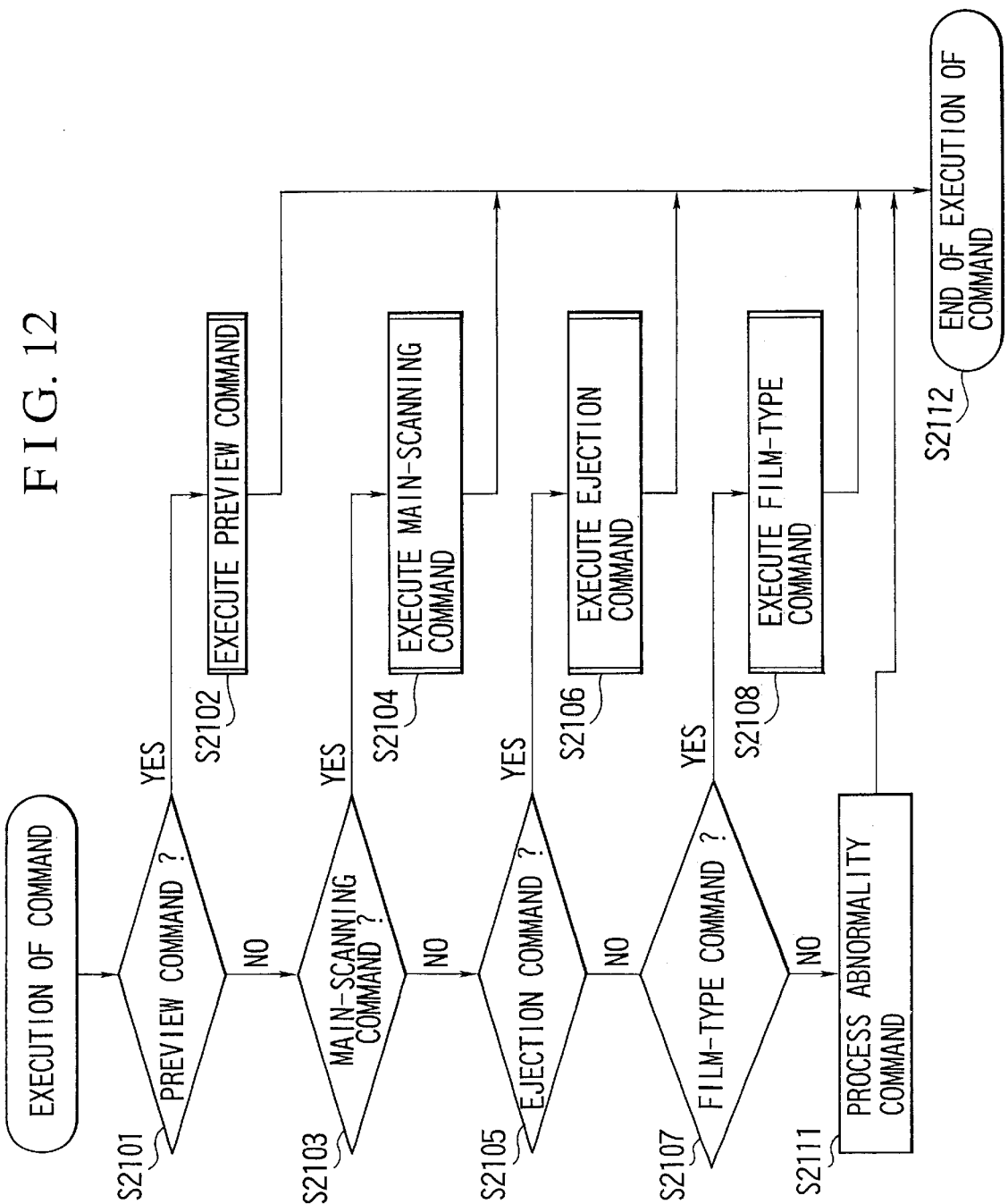

| IMAGE PLANE SIZES OF VARIOUS FILM FORMATS | | | | |
|---|---|---|---|---|
| FORMAT | 135 | APS | | |
| | | H | P | C |
| IMAGE PLANE SIZE (mm) | 23×34 | 16.7×30.2 | 9.5×30.2 | 16.7×23.4 |

IMAGE READING APPARATUS

BACKGROUND OF THE INVENTION

1. Field of the Invention

The present invention relates to an image reading apparatus adapted for use in reading images.

2. Description of Related Art

FIG. 20 shows the arrangement of a film scanner as an example of conventional image reading apparatuses.

Referring to FIG. 20, an illuminating light source 2801 is arranged to illuminate a film. A film holder 2802 is arranged to hold the film and to be movable in the direction of an arrow A as viewed in FIG. 20. Light emitted from the illuminating light source 2801 passes through the film. An image forming lens 2803 is arranged to form an image of the light having passed through the film on a CCD linear image sensor 2804 (hereinafter referred to simply as the CCD).

The CCD 2804 is disposed such that its longitudinal direction coincides with a direction Z shown in FIG. 20. Accordingly, because of the positional relation between the film holder 2802 and the CCD 2804, a horizontal scanning direction, which is the longitudinal direction of the CCD 2804, is perpendicular to a vertical scanning direction, which is the moving direction of the film holder 2802. In adjusting focus, while the image forming lens 2803 (optical system) is kept stationary, the film holder 2802 holding the film original and a moving mechanism arranged to move the film holder 2802 including a shaft, etc., are moved in the direction of an optical axis (in the direction of an arrow B) by means of a focus adjusting motor (not shown), so that an in-focus state on the film is obtained.

An analog image processing circuit 2805 is arranged to perform gain setting and clamp processing actions on an analog image signal outputted from the CCD 2804. An A/D converter 2806 is arranged to convert the analog signal into a digital signal. A digital image processing circuit 2807 processes the digital image signal and is provided with a gate array for processing a CCD driving pulse signal, etc. The digital image processing circuit 2807 is thus arranged to be capable of carrying out various processes at a high speed. A line buffer 2808 is arranged to temporarily store image data. An interface part 2809 is provided for communication with an external apparatus 2810 which is, for example, a personal computer or the like.

A system controller 2811 is arranged to store a sequence of actions of the whole film scanner and to cause various actions to be carried out in accordance with commands coming from the external apparatus 2810. A CPU bus 2812 is arranged to connect the system controller 2811 to the digital image processing circuit 2807, the line buffer 2808 and the interface part 2809. The CPU bus 2812 is composed of an address bus and a data bus.

A vertical-scanning motor 2813 is provided for moving the film holder 2802 in the vertical scanning direction, i.e., in the direction of the arrow A. A stepping motor is employed as the vertical-scanning motor 2813. A vertical-scanning motor driver 2814 is arranged to drive the vertical-scanning motor 2813 according to an instruction coming from the system controller 2811. A vertical-scanning position detecting part 2815 is arranged to detect the datum position of the vertical scanning by detecting a projection of the film holder 2802 by means of a photo-interrupter. A light source lighting circuit 2816 is arranged to turn on the illuminating light source 2801.

In the arrangement described above, the film scanner is arranged to output image data to the external apparatus 2810 through the communication of a software included in the system controller 2811 (hereinafter referred to as the firmware) with a software for operating the film scanner from the external apparatus 2810 such as a personal computer (hereinafter referred to as the driver software).

The procedures for operating the film scanner are next briefly described with reference to FIG. 21 which is a flow chart. The power supplies of the film scanner and the external apparatus 2810 are assumed to be turned on to start the firmware and the driver software, and a film is assumed to be inserted in a predetermined position by a user under this condition.

At a step S2901, when the user operates the external apparatus 2810 to give an instruction for preview, the external apparatus 2810 communicates through the driver software with the firmware of the film scanner to send to the film scanner designated information about the kind of film, the reading range (a whole image plane, in this instance) and the reading resolution (low resolution, in this instance). At a step S2902, upon receipt of the designated information, the firmware makes electrical preparation by setting, as designated, information relative to the kind of the film, the reading range and the reading resolution.

At a step S2903, the system controller 2811 reads information from the vertical-scanning position detecting part 2815 and controls the vertical-scanning motor 2813 to move the film to an initial position. At a step S2904, the light source lighting circuit 2816 is instructed to turn on the light source 2801. At a step S2905, the system controller 2811 outputs an instruction for output of timing pulses relative to reading one line, such as pulses for driving the CCD and controlling the address of a RAM.

At a step S2906, the vertical-scanning motor 2813 is driven at a predetermined speed. The digital image processing circuit 2807 is caused to perform an AE (automatic exposure) process on the basis of a signal obtained from the CCD 2804 in such a way as to set an apposite brightness. After the AE process, the vertical-scanning motor 2813 is driven to bring the film back to its datum position. The vertical-scanning motor 2813 is again driven to move the film approximately to its middle position and is then brought to a stop.

A focus adjusting action is next performed by moving the film holder 2802 in the direction of the optical axis. The digital image processing circuit 2807 is caused to sample a high-frequency component of each of signals outputted from all the picture elements of the CCD 2804. The film holder 2802 is fixed in a position where a peak value of the high-frequency component is obtained by the sampling process. Then, the vertical-scanning motor 2813 is again driven to bring the film back to the datum position. The timing pulses related to one line reading are outputted. The image data is read for each line at a predetermined exposure time. After that, the digital image processing circuit 2807 is caused to perform its image processing action. Image data thus obtained is sent to the external apparatus 2810.

At the next step S2907, upon completion of scanning the image reading area or range (the whole image plane, in this case), the system controller 2811 causes the vertical-scanning motor 2813 to bring the film back to the initial position. Then, the light source 2801 is put out. Each of the functions is brought to a stop as soon as all image data are outputted. At a step S2908, the firmware of the system controller 2811 enters a routine of waiting for the next command. At a step S2909, the image data is received by the external apparatus 2810. The external apparatus 2810 then provides the user with a whole image of the film by serially displaying images received.

At a step 82910, the user observes the image data provided for preview and further sets conditions for taking images as desired. The user then gives an instruction for main scanning on the basis of the image capturing conditions thus set. Then, like at the above-stated step S2901, the driver software of the external apparatus 2810 sends the designated information about the kind of the film, the reading area, i.e., a reading range designated by the user, and the reading resolution, i.e., a reading resolution designated by the user, to the firmware of the film scanner. At a step S2911, upon receipt of the information on the reading conditions from the external apparatus 2810, the system controller 2811 executes the actions of the above-stated steps S2902 to S2908 under conditions set for the main scanning.

At a step S2912, the image data sent to the external apparatus 2810 is displayed and is arranged to be storable in a discrete storage medium, such as a hard disk, a magneto-optical disk, a floppy disk or the like.

The conventional film scanner described above, however, necessitates many members to be moved for a focusing action (focus adjustment). These members cause an increase in mechanical load and degrade the quality of images as they prevent attaining an adequate degree of film surface moving precision. Further, in cases where images are to be read through an adapter by transporting a long film which is rolled into a coiled shape, focus must be adjusted by moving, at the same time, the film transport adapter which is heavy. In such a case, the mechanical load further increases.

The conventional film scanner described above has presented another problem. Since the automatic focusing (AF) action is arranged to be carried out by scanning again the film after the same film is scanned once for an automatic exposure (AE) setting action at the time of prescanning and is brought back to the initial position, the images cannot be taken in before completion of these two actions. The arrangement of the conventional film scanner thus requires an excessively long time before the commencement of an actual image scanning operation. The comfort of operational environment thus has been impaired by the long time required for the preliminary actions.

BRIEF SUMMARY OF THE INVENTION

It is an object of the invention to provide an image reading apparatus which is arranged to be capable of stably reading images.

It is another object of the invention to provide an image reading apparatus which is arranged to permit reduction in mechanical load thereon.

It is a further object of the invention to provide an image reading apparatus arranged to permit focus adjustment to be easily accomplished.

To attain the above objects, in accordance with one aspect of the invention, there is provided an image reading apparatus which comprises holding means for holding an original, an image sensor for picking up an image from the original held by the holding means, a lens for forming on the image sensor an image of light having passed through the original, fixing means for keeping a distance between the image sensor and the lens constant, and focus adjusting means for adjusting focus by moving the fixing means with respect to the original.

The above-stated arrangement not only permits reduction of mechanical load imposed on the image reading apparatus but also enables the image reading apparatus to stably read images and to adjust focus without difficulty.

These and further objects and features of the invention will become apparent from the following detailed description of embodiments thereof taken in conjunction with the accompanying drawings.

BRIEF DESCRIPTION OF THE SEVERAL VIEWS OF THE DRAWING

FIGS. 7(a) and 7(b) are perspective views showing in detail a focus adjusting part of a film scanner which is arranged as a third embodiment of the invention.

FIG. 12 is a flow chart showing command executing processes in the fifth embodiment.

DETAILED DESCRIPTION OF THE INVENTION

Hereinafter, preferred embodiments of the invention will be described in detail with reference to the drawings.

First Embodiment

Figure 1:
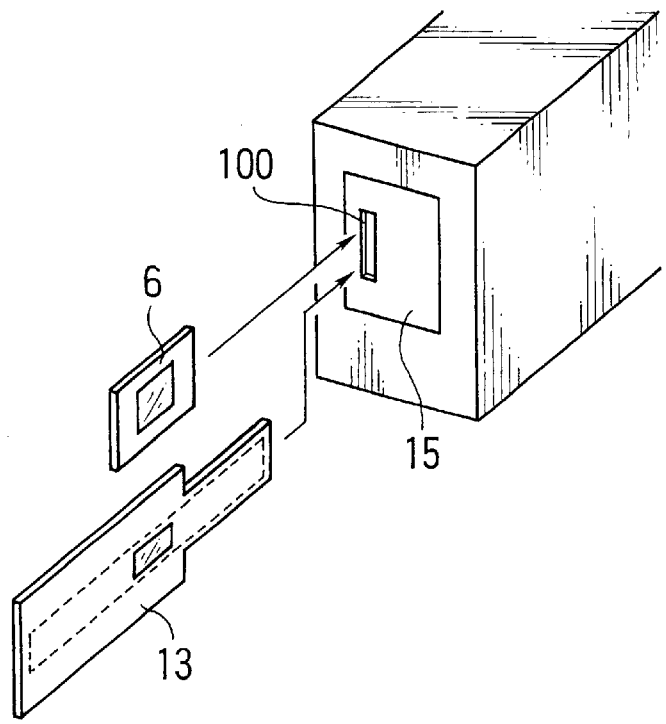
FIG. 1 is a perspective view showing the appearance of a film scanner which is arranged according to the invention as a first embodiment thereof.
Figure 2:
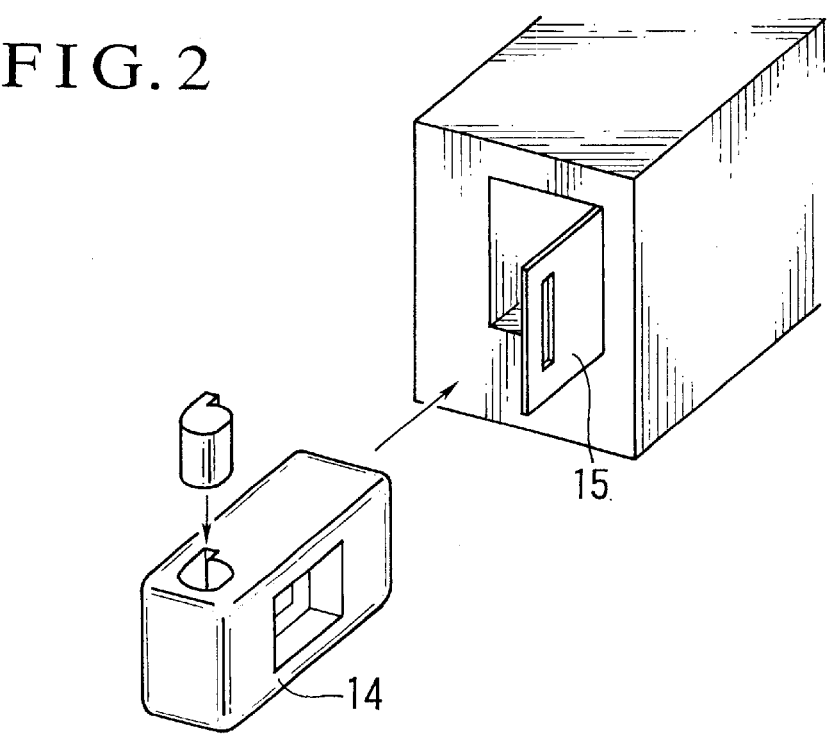
FIG. 2 is another perspective view of the same film scanner arranged as the first embodiment of the invention.

FIGS. 1 and 2 are perspective views showing the appearance of a film scanner which is an image reading apparatus arranged according to the invention as a first embodiment of the invention. The film scanner is capable of reading images recorded on films of three different kinds, i.e., a positive film mounted on a film mount 6 serving as a holding means, a sleeve-shaped film held by a film holder 13 serving as another holding means and a long film pulled out from a cartridge stowed in a film adapter 14 serving as a further holding means. The film scanner has an inserting port 100 arranged to allow the film mount 6 and the film holder 13 to be inserted into the film scanner therethrough. For the film adapter 14, a panel 15 is arranged to be openable to allow the film adapter 14 to be inserted into the film scanner through an enlarged inserting port.

Figure 3:
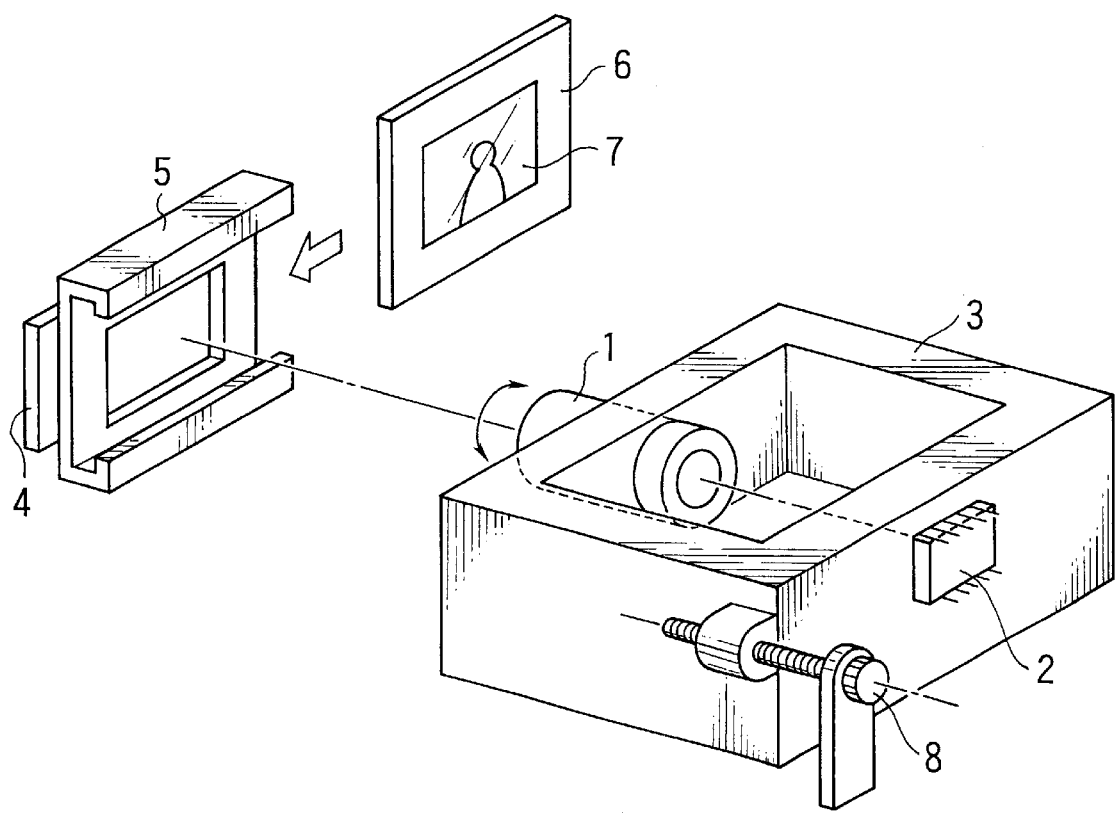
FIG. 3 is a perspective view showing in detail a focus adjusting part in the first embodiment.

FIG. 3 shows a focus adjusting mechanism incorporated in the film scanner in the first embodiment of the invention. Referring to FIG. 3, when a light source 4 is turned on with the film mount 6 inserted in a film holder 5 serving as a holding means, a film 7 having a recorded image is illuminated by the light source 4. Then, an image of light transmitted through the film 7 is formed by an image forming lens 1 on an area CCD 2, which is an image sensor. The image forming lens 1 and the area CCD 2 are fixedly mounted on a sensor box 3 which serves as a fixing means to make the optical axis of the image forming lens 1 coincide with the center of the area CCD 2 and the center of the film 7.

The sensor box 3 is provided with a female screw for engaging a male screw of a focus adjustment knob 8. Focus adjusting means are formed jointly by these parts. The rotary shaft of the focus adjustment knob 8 is disposed in parallel with the optical axis of the image forming lens 1. The sensor box 3 can be moved back and forth along the optical axis of the image forming lens 1 by rotating the focus adjustment knob 8. A distance between the film 7 and the image forming lens 1 can be changed and adjusted by rotating the focus adjustment knob 8 while keeping the optical axis of the image forming lens 1 unvarying. The image forming lens 1 thus can be focused on the image on the film by moving the image forming lens 1 and the area CCD 2 simultaneously along the optical axis. A distance between the image forming lens 1 and the area CCD 2 is fixed as they are fixed and secured to one and the same member. Therefore, the rate of magnifying the image on the area CCD 2 is not caused to vary by a focusing (focus adjusting) action. The size of the formed image thus remains constant during the process of focus adjustment.

Second Embodiment

Figure 4:
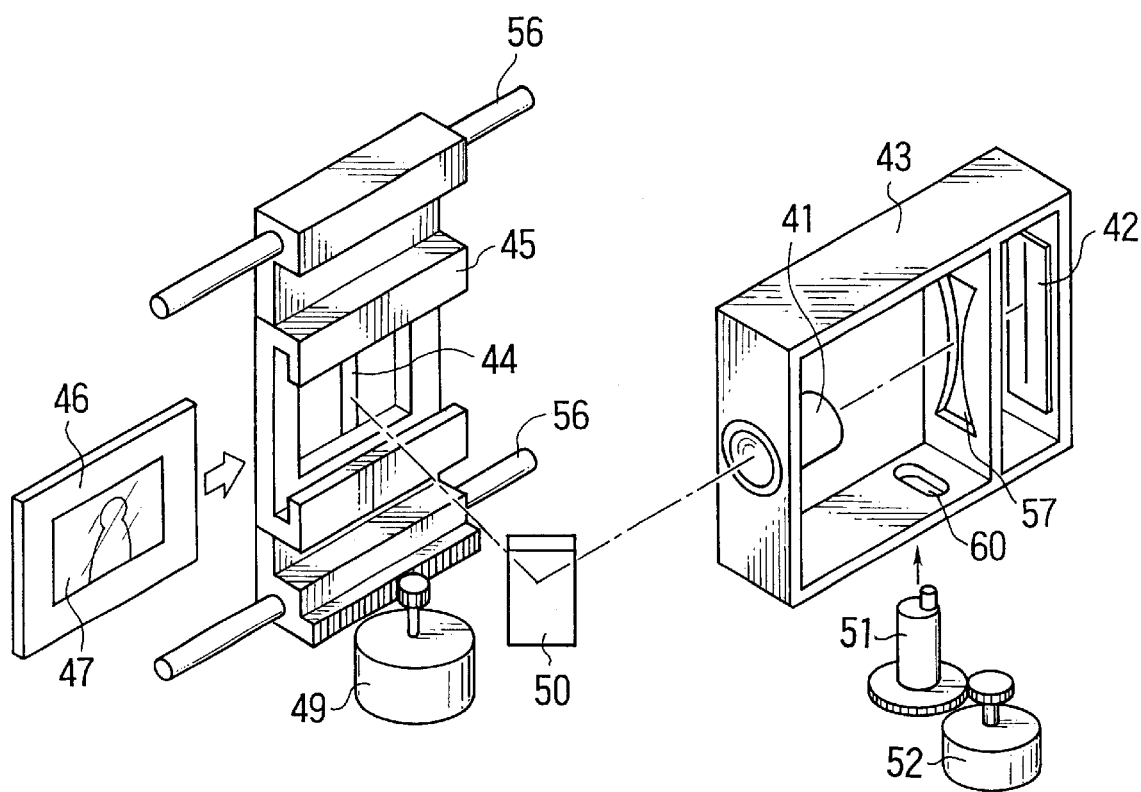
FIG. 4 is a perspective view showing in detail a focus adjusting part of another film scanner arranged as a second embodiment of the invention.

FIG. 4 shows the arrangement of a focus adjusting mechanism incorporated in a film scanner in a second embodiment of the invention. Referring to FIG. 4, a film 47 having a recorded image is illuminated by a light source 44 when the light source 44 is lighted up with a film mount 46 inserted in a film holder 45. An optical path of light transmitted through the film 47 is bent 90 degrees by a mirror 50. Then, an image of light transmitted through the film 47 is formed by an image forming lens 41 on a line CCD 42, which is an image sensor. A slit 57 for correction of shading is provided between the image forming lens 41 and the line CCD 42.

The image forming lens 41 and the line CCD 42 are fixedly mounted on a sensor box 43 in such a way as to make the optical axis of the image forming lens 41 coincide with the center of the line CCD 42 and the center of the film 47. The film holder 45 is arranged to be moved in the vertical scanning direction along guide shafts 56 by a vertical-scanning motor 49 which is composed of a stepping motor. When the vertical-scanning motor 49 rotates by one step, the film 47 is moved along the guide shafts 56 as much as a distance corresponding to one line of the line CCD 42. With the film 47 moved in this manner, an image reading action is performed on the next one line. The vertical-scanning motor 49 and the guide shafts 56 jointly constitute a moving means.

By repeating the action described above, an image existing on the whole surface of the film 47 can be eventually read out from the film 47 by the line CCD 42.

The sensor box 43 is provided with a cam slot 60, which engages an eccentric shaft 51. The eccentric shaft 51 is arranged to be rotated through gears by a focusing motor 52. The rotation of the eccentric shaft 51 causes the sensor box 43 to move in the direction of the optical axis of the image forming lens 41 in parallel thereto. The cam slot 60, the eccentric shaft 51 and the focusing motor 52 jointly constitute a focus adjusting means. Thus, a focusing action can be accomplished by varying a distance between the film 47 and the image forming lens 41 while keeping the optical axis of the image forming lens 41 unvaried. In this case, the film mount 46 and the film holder 13 differ in thickness by 1 mm. As a result, the position of the film 47 relative to the sensor box 43 varies to an extent of 0.5 mm. Therefore, the amount of eccentricity of the eccentric shaft 51 is set at 1 mm, so that focusing can be accomplished despite the deviation of the film position.

Figure 5:
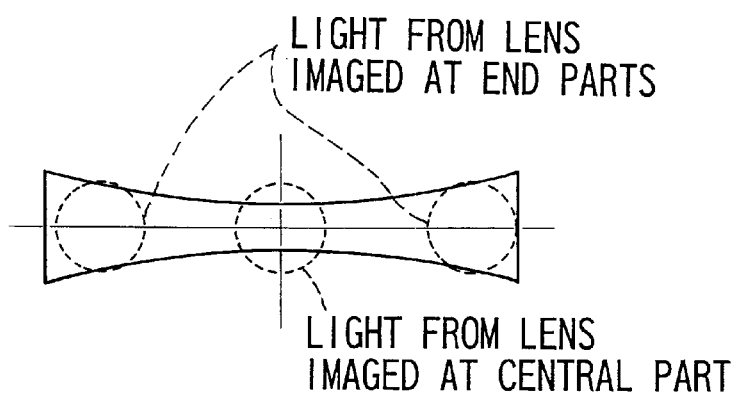
FIG. 5 shows the shape of a slit provided in the second embodiment of the invention.
Figure 6:
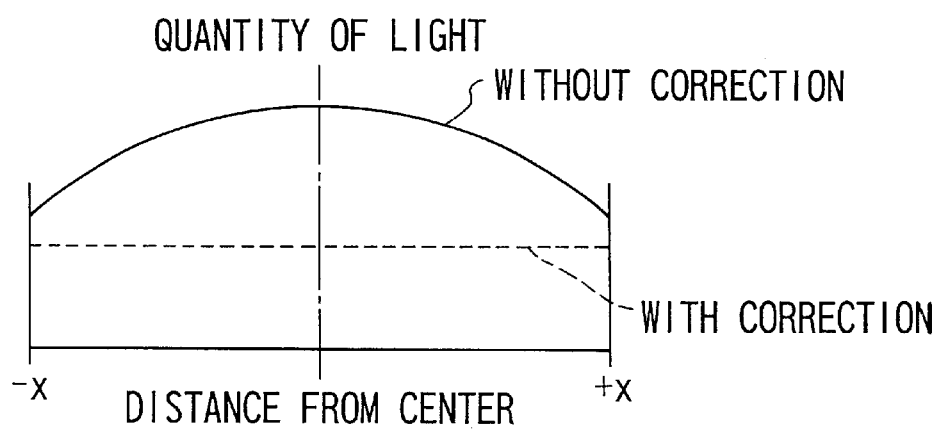
FIG. 6 shows, for comparison, light-quantity distributions obtained on a CCD in the second embodiment.

As mentioned above, the slit 57 is formed in the sensor box 43. FIG. 5 shows the slit 57 in an enlarged view. FIG. 6 shows a light-quantity distribution obtained on the line CCD 42 without passing the light through the slit 57 in forming the image, i.e., "without correction", and another-light quantity distribution obtained on the line CCD 42 with the light passed through the slit 57, i.e., "with correction". As apparent from FIG. 6, in a case where the light-quantity distribution is not corrected by means of the slit 57, the quantity of light becomes largest in the central part of the line CCD 42, as shown by a full line curve, due to the light-quantity distribution of the light source and a drop of the quantity of light in peripheral parts of the lens 41.

Therefore, the slit 57 is formed in such a shape as to pass a less quantity of light to be imaged on the central part of the line CCD 42 and a larger quantity of light to be imaged on the peripheral parts of the line CCD 42. The light-quantity distribution correcting action of the slit 57 enables the second embodiment to have the quantity of light evenly distributed to all parts of the line CCD 42 irrespectively of their distances from the center of the line CCD 42, as shown by a broken line in FIG. 6.

As described above, the use of the line CCD 42 in combination with the slit 57 enables the second embodiment to form an image of uniform light distribution on the line CCD 42. Further, even in cases where images are to be read out from films of different formats, the arrangement disclosed above enables the second embodiment to accurately carry out a focusing action despite a difference in position among films relative to the CCD, i.e., the image sensor. Another advantage of the second embodiment lies in that, for the arrangement to permit insertion of films of three different formats, a lens-CCD unit is arranged to have a relatively light weight and to be movable for a focusing action, so that a load imposed on the film transport system can be substantially reduced.

Third Embodiment

FIGS. 7(*a*) and 7(*b*) relate to a film scanner arranged as a third embodiment of the invention. The fundamental arrangement of the third embodiment is similar to that of the second embodiment shown in FIG. 4. However, as shown in FIG. 7(a), the third embodiment differs from the second embodiment in that bayonet claws 88 are arranged to slidably hold the sensor box 73 in such a way as to cover an opening part of the sensor box 73. FIG. 7(b) shows the reverse side of the arrangement shown in FIG. 7(a). Since a bayonet structure is employed to cover the opening part of the sensor box 73, external light and dust can be prevented from intruding into the sensor box 73.

Fourth Embodiment

Figure 8:
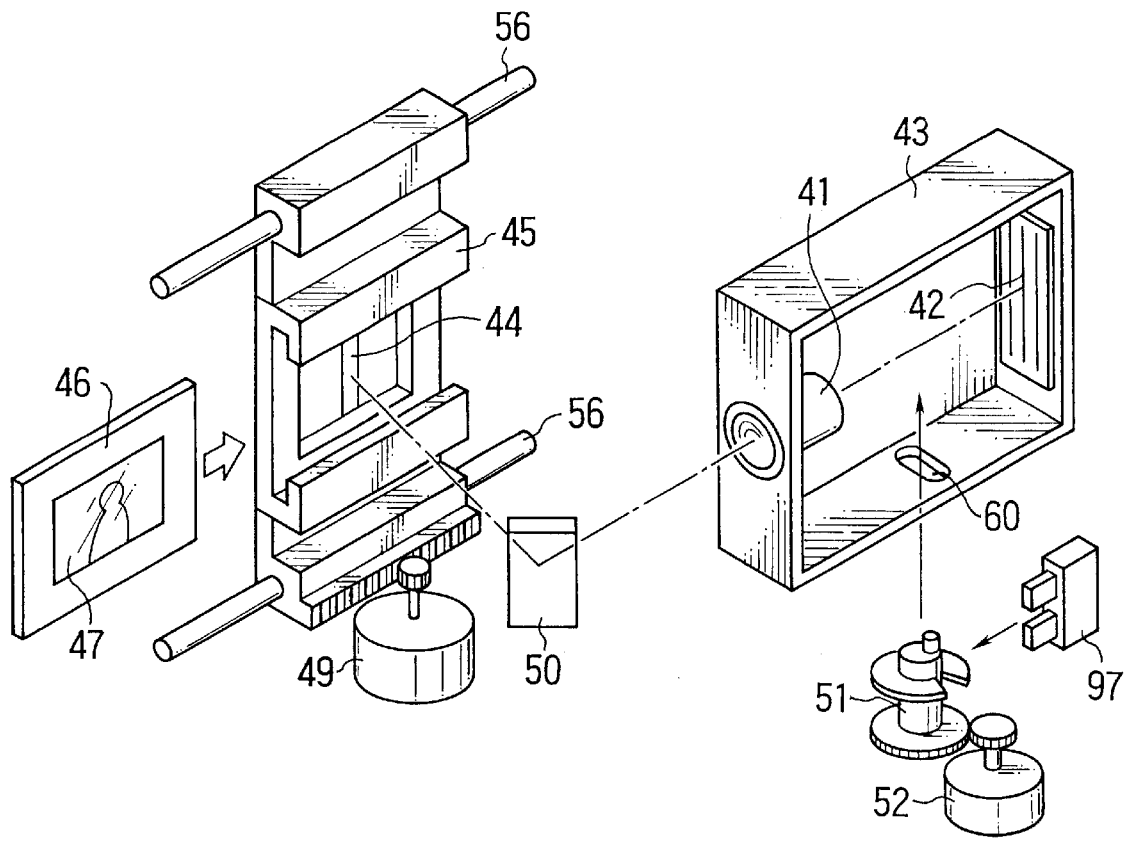
FIG. 8 is a perspective view showing in detail a focus adjusting part of a film scanner which is arranged as a fourth embodiment of the invention.

FIG. 8 shows a film scanner arranged as a fourth embodiment of the invention. The fourth embodiment is arranged fundamentally in the same manner as the film scanner shown in FIG. 4 as the second embodiment of the invention. However, the fourth embodiment differs in that the image sensor is composed of a line CCD 42 which is arranged to be exposed to light in three colors on three lines through a one-chip filter of R (red), G (green) and B (blue) colors. The fourth embodiment also differs in that a photo-interrupter 97 is provided for detecting a reset position of the eccentric shaft 51. In FIG. 8, the slit between the image forming lens 41 and the line CCD 42 is omitted. However, the slit of course may be disposed there.

Figure 9:
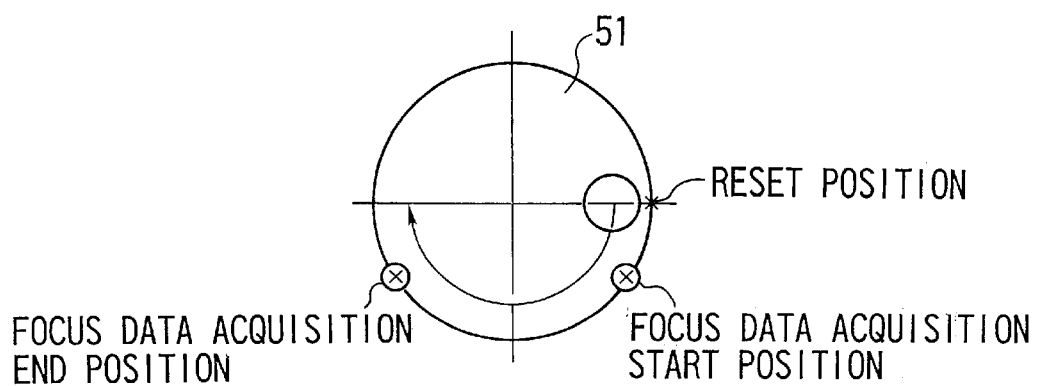
FIG. 9 is a top view showing an eccentric shaft included in the fourth embodiment of the invention.

FIG. 9 shows the eccentric shaft 51 as viewed directly from above. Referring to FIG. 9, when a pin provided at the top of the eccentric shaft 51 is in a reset position, the level of the output of the photo-interrupter 97 is low to indicate the origin of rotation. The gear ratio of the device is set in such a way that one rotation of the eccentric shaft 51 corresponds to 144 steps of the stepping motor 52. A focusing action is performed by rotating the eccentric shaft 51 in the direction of an arrow as shown in FIG. 9. The number of steps at which focus is to be evaluated is thus reduced for the number of steps of the stepping motor 52 per rotation of the eccentric shaft 51. Therefore, focus evaluation can be made at a high speed. An automatic focusing action to be actually carried out will be described in detail later.

Fifth Embodiment

Figure 10:
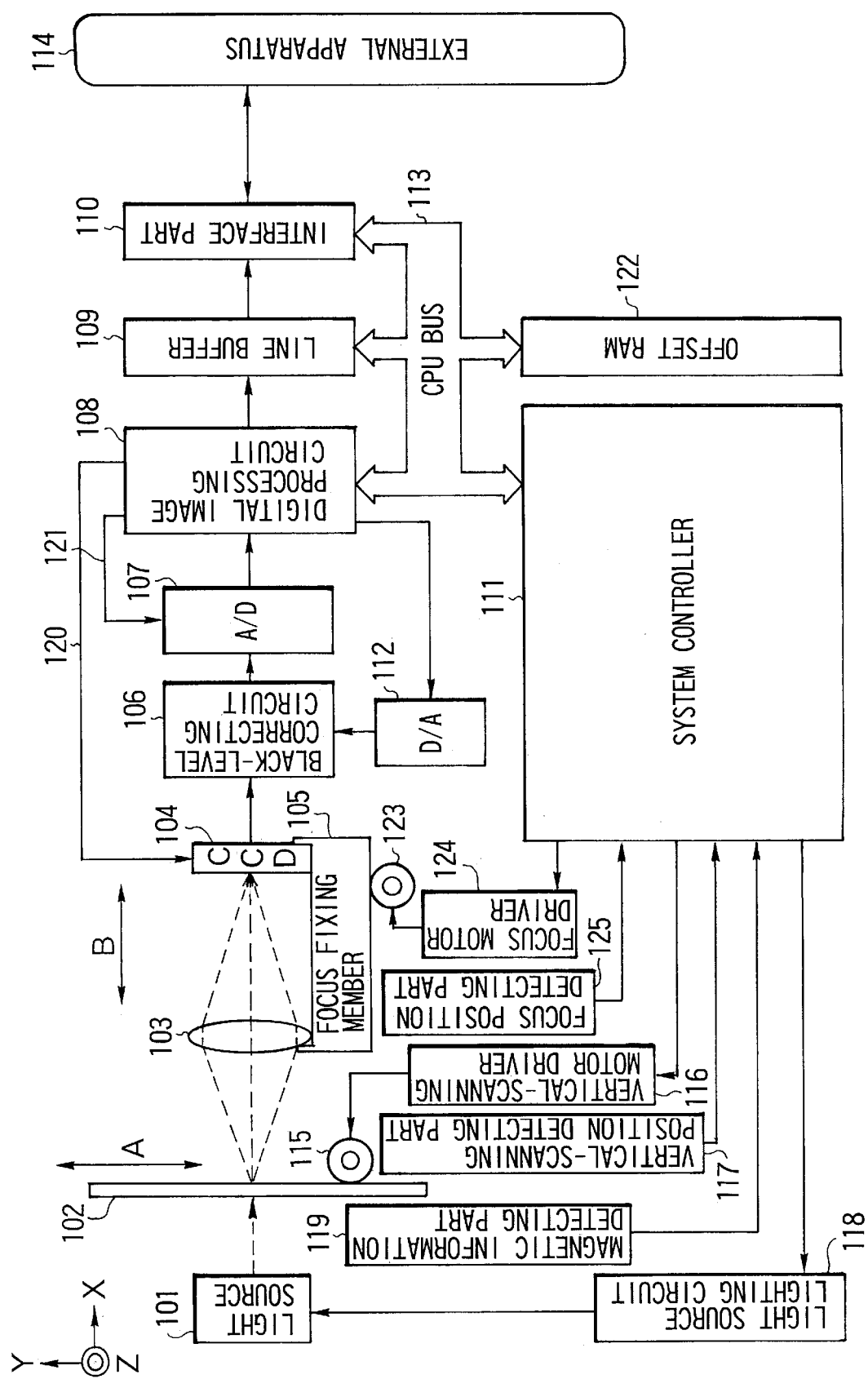
FIG. 10 is a block diagram showing the electrical arrangement of a film scanner arranged according to the invention as a fifth embodiment thereof.

FIG. 10 is a block diagram showing, as a fifth embodiment of the invention, the internal electrical arrangement of a film scanner which includes a mechanical arrangement as described in the foregoing with reference to FIGS. 1 to 9.

Referring to FIG. 10, a cold cathode ray tube 101 is employed as an illumination light source which is arranged to illuminate a film. A film holder 102 is arranged to hold the film as a transparent original and to permit the film to be moved in the direction of an arrow A shown in FIG. 10. An image forming lens 103 is arranged to cause an image of light passing through the film illuminated by the illumination light source 101 to be formed on a CCD liner image sensor (hereinafter referred to either as the linear image sensor or simply as the CCD) 104. The longitudinal arrangement of the linear image sensor 104 extends in the direction Z as shown FIG. 10 (perpendicular to the paper surface of the drawing). The positional relation is such that a horizontal scanning direction, which is the longitudinal direction of the linear image sensor 104, is at right angles with (perpendicular to) a vertical scanning direction, which is the moving direction of the film holder 102.

A focus fixing member 105 is arranged to integrally hold the linear image sensor 104 and the image forming lens 103 together in the neighborhood of an image plane and to be movable in the direction of an optical axis, i.e., in the direction of an arrow B shown FIG. 10. A black-level correcting circuit 106 is arranged to adjust the black level of an analog image signal outputted from the linear image sensor 104. An A/D converter 107 is arranged to convert the black-level-adjusted analog signal into a digital signal. A digital image processing circuit 108 is composed of a gate array which is arranged to perform an image processing action as will be described later herein and also to process CCD driving pulses. The digital image processing circuit 108 is thus arranged to be capable of carrying out its processes at a high speed.

A line buffer 109 is arranged to temporarily store image data. A general-purpose random access memory is employed as the line buffer 109. An interface part 110 is provided for communication with an external apparatus 114, which is a personal computer or the like. A system controller 111 is arranged to include therein a storage device for the sequence of actions of the whole film scanner and to function as a control means for causing the film scanner to perform various actions in accordance with instructions coming from the external apparatus 114. A CPU bus 113 is arranged to interconnect the system controller 111, the digital image processing circuit 108, the line buffer 109 and the interface part 110. The CPU bus 113 is composed of an address bus and a data bus.

A vertical-scanning motor 115 is arranged to move the film holder 102 in the vertical scanning direction (in the direction of the arrow A). In this case, a stepping motor is employed as the vertical-scanning motor 115. A vertical-scanning motor driver 116 is arranged to drive the vertical-scanning motor 115 in accordance with instructions from the system controller 111. A vertical-scanning position detecting part 117 is provided for detecting the datum position of vertical scanning. For this purpose, a projection of the film holder 102 is detected by using a photo-interrupter. A light source lighting circuit 118 is a so-called inverter circuit and is arranged to turn on the cold cathode ray tube 101.

A driving signal 120 is sent to the linear image sensor 104 for driving it. A sample-and-hold control signal 121 is sent for sampling and holding an input signal. An offset RAM 122 which serves as a working area in processing an image is arranged to store data of various kinds such as data for shading correction, data for gamma correction, data for color data composition, etc., and also to temporarily store image data. A focus motor 123 is arranged to move the focus fixing member 105 in the direction of an optical axis as indicated by the arrow B. A focus motor driver 124 is arranged to supply a driving signal to the focus motor 123. A focus position detecting part 125 is arranged to detect the initial position of the focus fixing member 105.

This film scanner in the fifth embodiment which is arranged as described above operates as described below referring to FIGS. 11(a) and 11(b) to FIG. 19, which are flow charts.

Figure 11B:
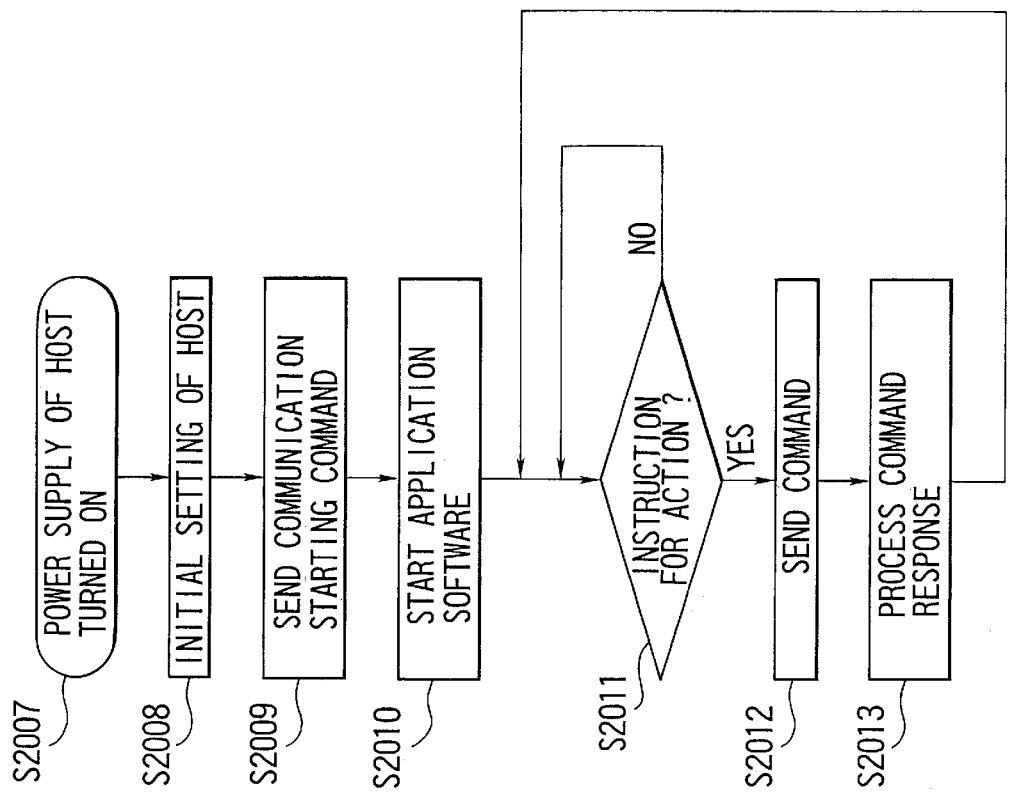
FIGS. 11(a) and 11(b) are flow charts showing patterns of communication between the film scanner and an external apparatus in the fifth embodiment.
Figure 11A:
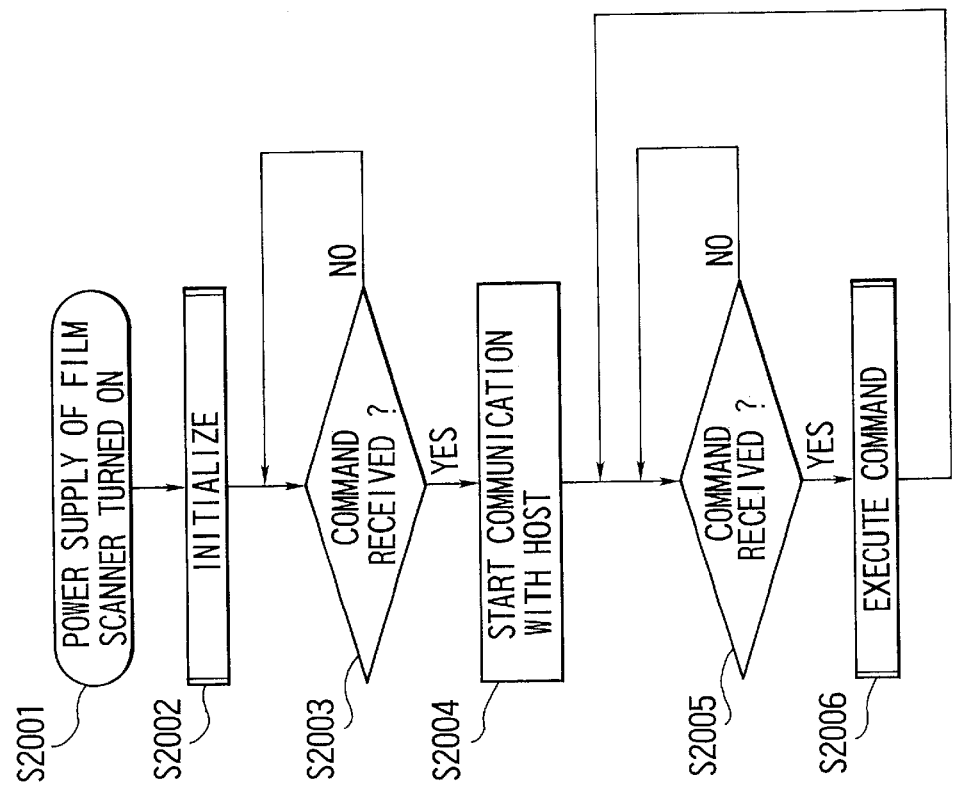

FIGS. 11(a) and 11(b) are flow charts showing a pattern of communication between the film scanner and the external apparatus 114. At a step S2001 shown in FIG. 11(a), the power supply of the film scanner is turned on. At a step 32002, the film scanner is initialized (by carrying out an initial setting action on the firmware, etc.). At a step 82007 shown in FIG. 11(b), the power supply of the external apparatus 114 (a host system) is turned on. At a step S2008, initial setting is performed on the side of the external apparatus 114 and a check is made for the states of a memory, an SCSI (small computer systems interface) device, etc.

At a step 52003, on the side of the film scanner, a routine to be executed before receiving a command is repeated, making a check for receipt of a communication from the external apparatus 114. Upon receipt of some command from the external apparatus 114, the flow of operation proceeds to a step 82004. At a step S2009, on the side of the external apparatus 114, a command for a start of communication is sent to permit communication with the film scanner. At the same time, at a step 82004, the film scanner begins to communicate with the external apparatus 114.

At a step 52010, the external apparatus 114 starts an application software which includes a driver software. At a step S2011, the user of the apparatus inputs instructions for actions to be performed by the film scanner within the application software. The instructions include an end of the application software. When the end of the application software is selected, the communication comes to a stop to bring the application software to an end. At the next step S2012, an instruction for actions is prepared as a command according to the driver software, and the command is sent to the film scanner.

On the side of the film scanner, a routine of making a check for receipt of the command is repeated at a step S2005. Upon receipt of the command, the flow proceeds from the step S2005 to a step S2006. At the step S2006, the firmware which is arranged as software within the system controller 111 causes a sequence of actions to be executed. Information on execution of each action is sent from the film scanner to the external apparatus 114.

At a step S2013, the external apparatus 114 receives information on the operating state of the film scanner and provides the user with the information according to the application software. Upon completion of execution of the command, the flow of operation of the external apparatus returns to the step S2011.

The command executing routine of the firmware at the step S2006 is carried out according to a flow of operation as shown in FIG. 12.

Referring to FIG. 12, a check is made at a step S2101 to find if the received command is for a preview operation (preview command). If so, the flow proceeds to a step S2102. If the command is found not to be the preview command, the flow proceeds to a step 52103. At the step S2102, a sequence of actions is performed to carry out the preview command. At the step S2103, a check is made to find if the command inputted is a command for main scanning (main scanning command). If so, the flow proceeds to a step S2104. If not, the flow proceeds to a rip step 62105. At the step S2104, a sequence of actions is performed to carry out the main scanning command.

At the step 62105, a check is made to find if the command is for ejection (ejection command). If so, the flow proceeds to a step 62106. If not, the flow proceeds to a step 62107. At the step 62106, a sequence of actions is performed to carry out the ejection command. At the step 62107, a check is made to find if the command is a command for adjustment to be made according to the type of film in use (film-type command). If so, the flow proceeds to a step 62108. It not, the flow proceeds to a step 62111. At the step 62108, a sequence of actions is performed to carry out the film-type command. At the step S2111, a process to be executed in the event of input of an abnormal command is performed. At a step 62112, information indicating that the command has been carried out is sent to the external apparatus 114, and the command executing routine comes to an end.

Figure 13:
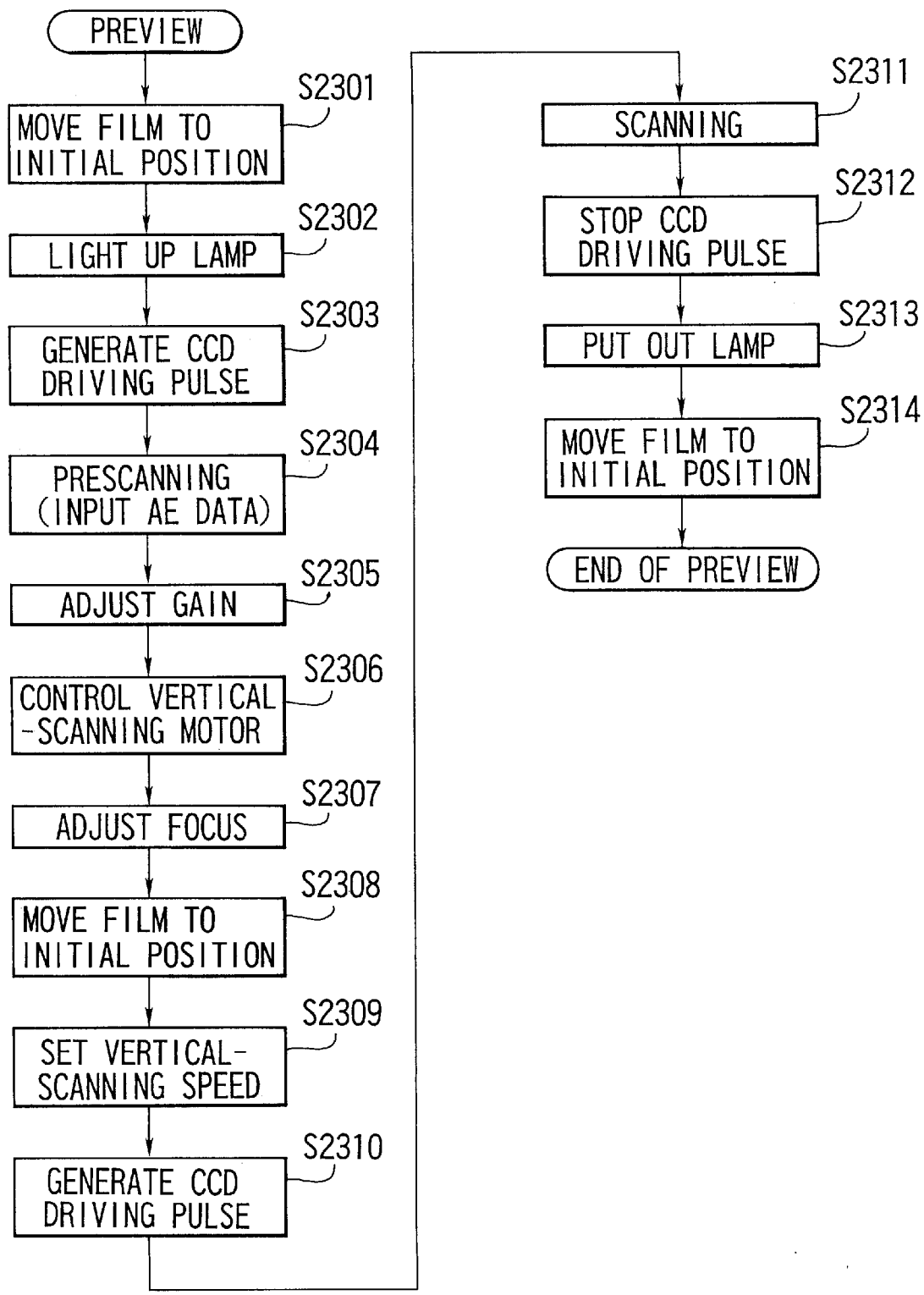
FIG. 13 is a flow chart showing steps of preview processes to be executed in the fifth embodiment.

FIG. 13 is a flow chart showing procedures to be taken by the system controller 111 of the film scanner in executing the preview command. Referring to FIG. 13, at a step 52301, with the preview command received, the system controller 111 monitors the state of the vertical-scanning position detecting part 117 and performs control to bring it to its initial position. At a step 52302, the light source lighting circuit 118 is instructed to turn on the light source 101. At a step S2303, the digital image processing circuit 108 is permitted to generate the CCD driving pulse signal 120. At a step S2304, light-quantity data is obtained by driving the vertical-scanning motor 115 to tentatively scan the film, i.e., to perform a prescanning action. In this case, the linear image sensor 104 is used as a light-quantity sensor. However, the quantity of light may be measured by using some other sensor discretely arranged specially for this purpose.

At the next step S2305, adjustment of gain is made on the basis of the light-quantity data obtained at the step S2304. The gain is increased, if the quantity of light is insufficient, and is lowered if the quantity of light is found to be saturated. At a step S2306, in rotating the vertical-scanning motor 115 to bring the film from an end position to its initial position after completion of the prescanning action of the step 32304, the vertical-scanning motor 115 is temporarily brought to a stop at the middle part of the film. The flow then proceeds to a step S2307 to carry out a focus adjusting action in a manner as will be described later.

After completion of the focus adjusting action at the step S2307, the flow proceeds to a step S2308. At the step 52308, the vertical-scanning motor 115 is caused to rotate to bring the film to its initial position. At a step S2309, a vertical-scanning speed for the preview is set. At a step S2310, a resolution for the preview is set and the linear image sensor driving pulse signal 120 is caused to be outputted. At a step S2311, a signal processing area for the preview is set at the digital image processing circuit 108. Then, a scanning action is performed.

After completion of the scanning action, the flow proceeds to a step S2312. At the step S2312, the driving pulse signal 120 which is generated at the step S2310 is brought to a stop. At a step S2313, the light source lighting circuit 118 is instructed to put out the light of the light source 101. At a step S2314, the film which has been moved by the scanning action at the step S2311 is moved back to its initial position. The flow of preview operation then comes to an end.

After completion of an AE (automatic exposure) process by the flow of operation, the film is brought back to its datum position by driving the vertical-scanning motor as described above. In that instance, an automatic focusing (AF) action is carried out by bringing the vertical-scanning motor 115 temporarily to a stop at about the middle part of the film. This method dispenses with a troublesome process of moving the film by again driving the vertical-scanning motor 115 for the AF action after moving the film temporarily back to its datum position after completion of the AE action. By virtue of this arrangement, a period of time required before the main scanning is shortened, so that the operating environment of the film scanner can be effectively improved.

Figure 14:
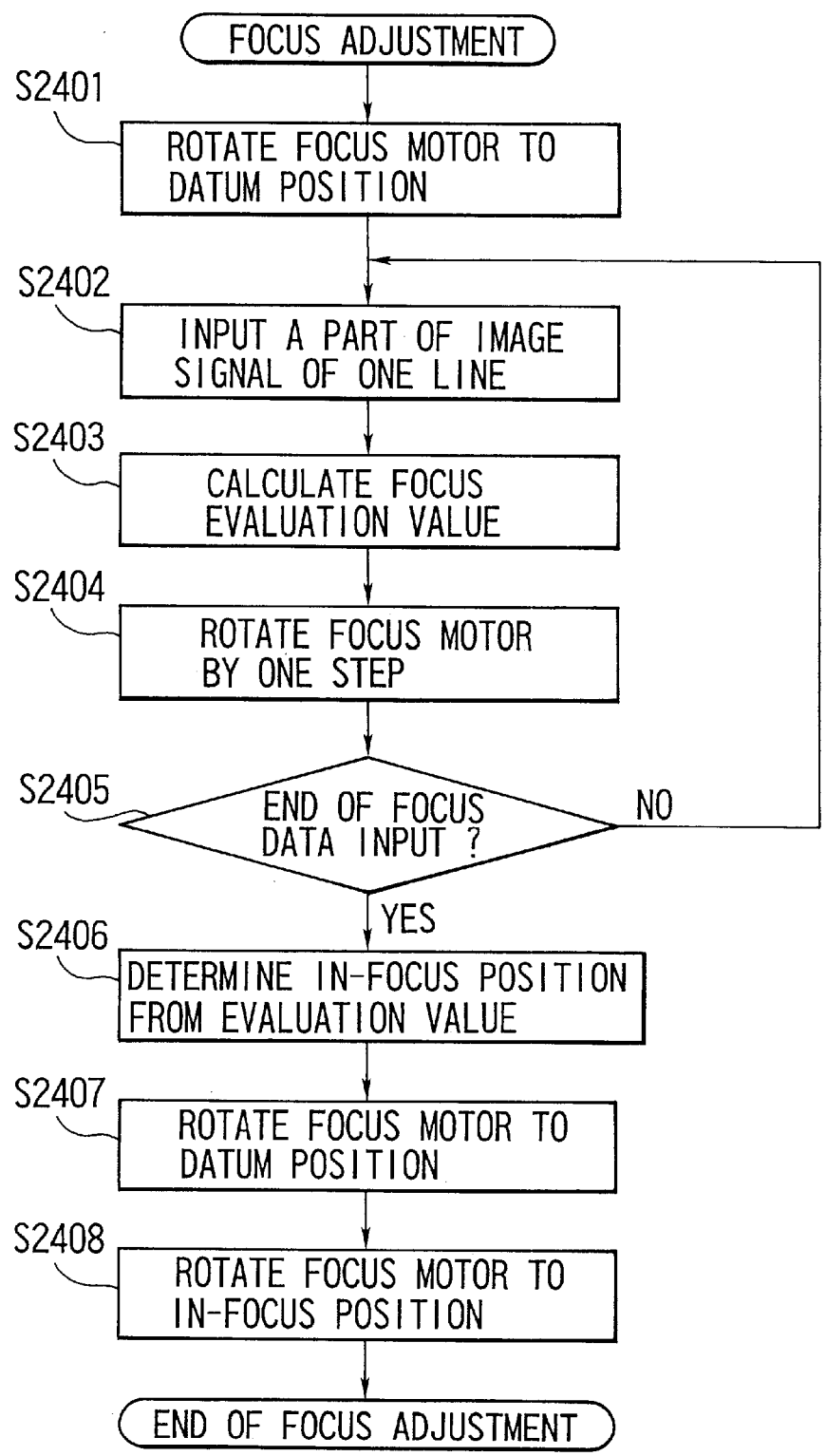
FIG. 14 is a flow chart showing steps of focus adjusting processes in the fifth embodiment.

FIG. 14 is a flow chart showing the details of the focus adjusting action at the step S2307 shown in FIG. 13. The focus adjusting action is carried out as follows. At a step S2401 in FIG. 14, the focus motor 123 is driven in such a way as to cause the level of the output of the photo-interrupter 97 shown in FIG. 8 to become low, and the focus fixing member 105 is reset by moving it to its initial position.

At a step S2402, the focus motor 123 is rotated up to a sixth step position from its reset position. With the focus motor 123 rotated in this manner, one third of the image signal representing a middle portion of image input of one line is obtained and is temporarily stored in the offset RAM 122.

Figures 15, 16:
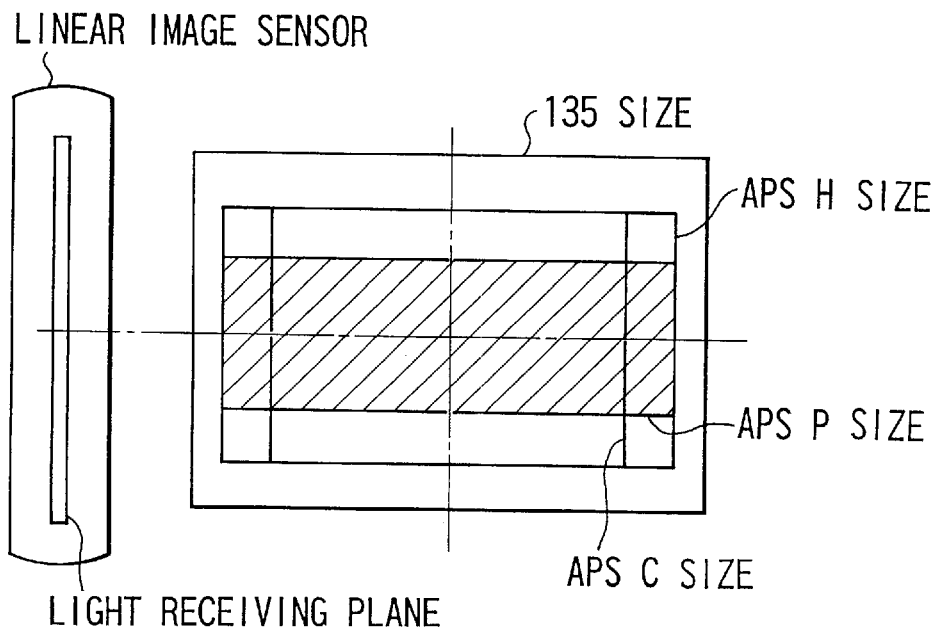
FIG. 15 shows a relationship between the light receiving surface of a linear image sensor and films of various kinds in the fifth embodiment.
FIG. 16 is a table showing the sizes of image planes defined by various film formats.

FIG. 15 shows the sizes of various films in relation to the light receiving surface of the linear image sensor 104. As shown, an image output obtained from one line of the linear image sensor 104 approximately corresponds to the format of 135 film. Meanwhile, the H (high-vision) size of a photo system called APS (Advanced Photo System™) is somewhat smaller than the size of the 135 film format. The P (panorama) size of the APS is still smaller in height of an effective image plane. FIG. 16 shows in a table the effective image plane sizes of the various film formats.

If the image outputs of all picture elements of one line of the linear image sensor 104 are used alike in reading these films of different effective image plane sizes, AF evaluation (evaluation of state of automatic focusing) would be made uselessly including parts where no film exists in the case of scanning a film of the APS format. In such a case, the value of AF evaluation tends to become inaccurate to make accurate automatic focusing hardly expectable. In view of this problem, the fifth embodiment is arranged to use for automatic focusing only the image signals that are outputted from picture elements located in the middle, one-third part of the linear image sensor 104. This arrangement enables the fifth embodiment to adequately carry out automatic focusing on all films of different formats by using only the areas of the linear image sensor 104 where the film exists.

With the image signal which is obtained from one line of the linear image sensor 104 temporarily stored in the offset RAM 122 at the step S2402 as mentioned above, the flow of operation proceeds to a step 32403. At the step S2403, the sharpness of image in each of colors R, G and B is computed to obtain a focus evaluation value. The focus evaluation value thus obtained is stored together with information on the position of focus. The sharpness is computed in accordance with a known computing method to obtain the square sum of a difference between the outputs of adjacent picture elements. The arrangement for making focus evaluation in three colors R, G and B makes the focus evaluation more accurately performed than a case where only one color is used for the focus evaluation. When the focus evaluation for one line is finished, the flow proceeds to a step 52404. At the step S2404, the focus motor 123 is caused to rotate by one step to shift the focus position by one step.

At a step S2405, a check is made to find if the focus evaluation has been carried out up to the 66th step by repeating the steps S2402 to S2404 to obtain focus data of all focusing areas. If so, the flow proceeds to a step S2406. If not, the flow returns to the step S2402. At the step 52406, a focus position having the highest of the focus evaluation values is determined to be an in-focus position. At a step S2407, the focus motor 123 is caused to move the focus fixing member 105 to a datum position, i.e., to its reset position. At a step S2408, the focus motor 123 is caused to move the focus fixing member 105 to the in-focus position. After that, the vertical-scanning motor 115 is driven to move the film to an initial vertical-scanning position. The execution of the focus adjusting command then comes to an end.

Figure 17:
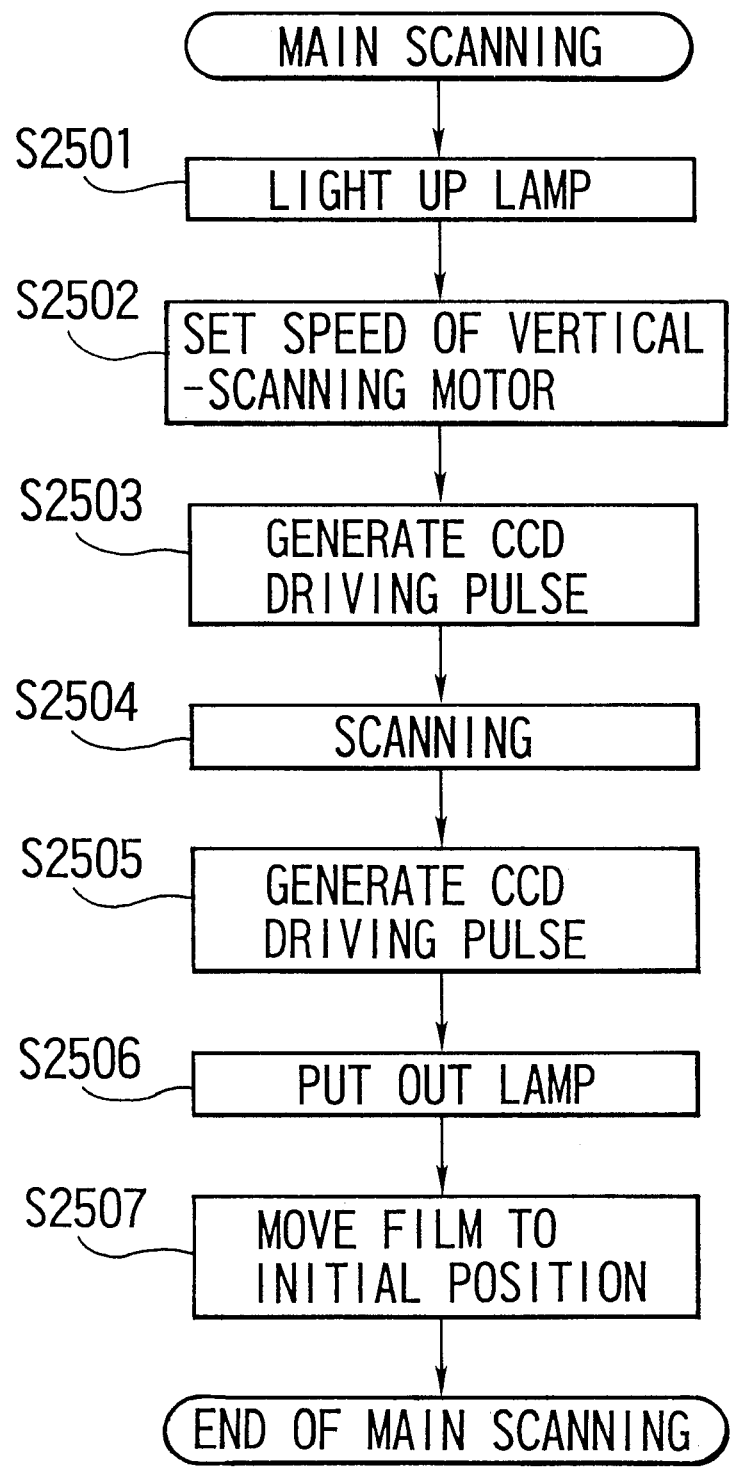
FIG. 17 is a flow chart showing steps of main scanning processes in the fifth embodiment.

FIG. 17 is a flow chart showing the details of the step S2106 shown in FIG. 12 provided for the main scanning to be executed by the system controller 111. Referring to FIG. 17, at a step 52501, the system controller 111 instructs the light source lighting circuit 118 to turn on the light source 101. At a step S2502, the speed of the vertical-scanning motor 115 is set according to a resolution indicated in the scanning command. At a step S2503, operation pulses for operation in the direction of horizontal scanning are set according to the resolution indicated in the scanning command, so that the CCD driving signal 120 is generated. At a step S2504, the amount of scanning in the vertical scanning direction and an image processing range in the horizontal scanning direction are decided, and a scanning operation is carried out accordingly. After completion of scanning, the flow proceeds to a step S2505.

At the step 52505, the CCD driving signal 120 an generated at the step S2503 is brought to a stop. At a step S2506, the light source lighting circuit 118 is instructed to put out the light source 101. At a step S2507, while the vertical-scanning position detecting part 117 is monitored, the vertical-scanning motor 115 is driven to move the film to its initial position, so that the execution of the main scanning command then comes to an end.

Figure 18:
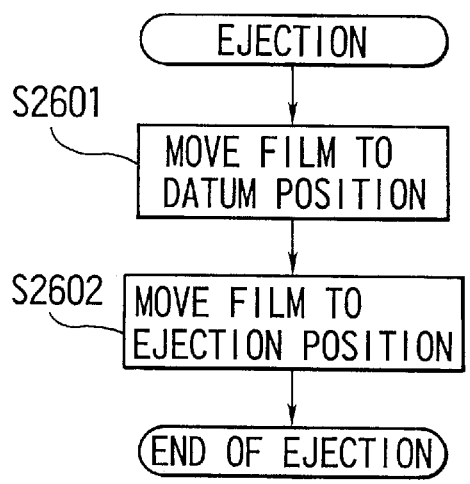
FIG. 18 is a flow chart showing steps of ejecting processes in the fifth embodiment.

FIG. 18 is a flow chart showing the details of the ejecting process at the step S2106 shown in FIG. 12 to be executed by the system controller 111. Referring to FIG. 18, at a step S2601, while the vertical-scanning position detecting part 117 is monitored, the vertical-scanning motor 115 is driven to move the film to its vertical-scanning datum position. At the next step S2602, the vertical-scanning motor 115 is driven to an extent corresponding to a predetermined number of pulses to move the film outward from the datum position to an eject position. Then, a current applied to the vertical-scanning motor 115 is brought to a stop to end the ejecting action.

Figure 19:
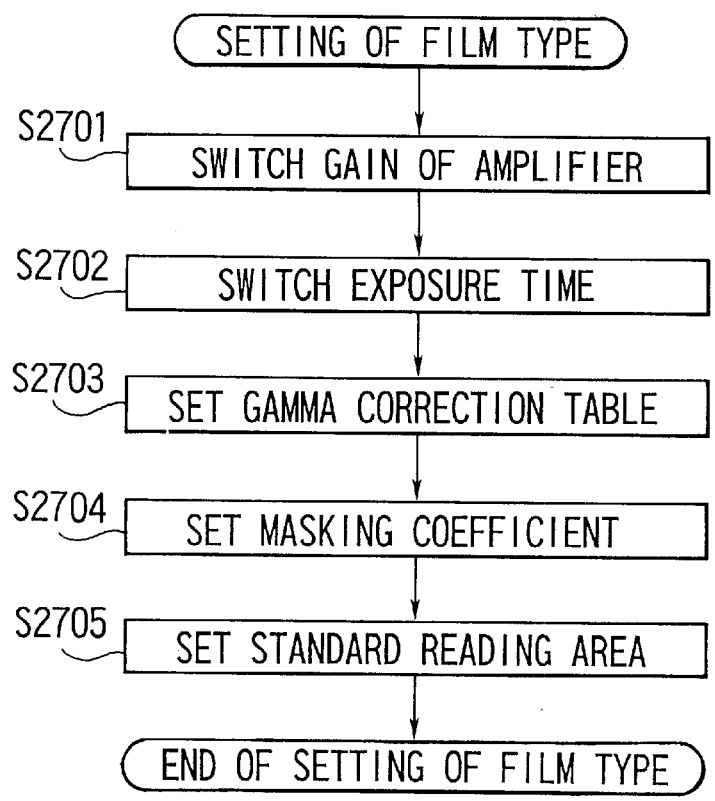
FIG. 19 is a flow chart showing steps of film-type setting processes in the fifth embodiment.
Figure 20:
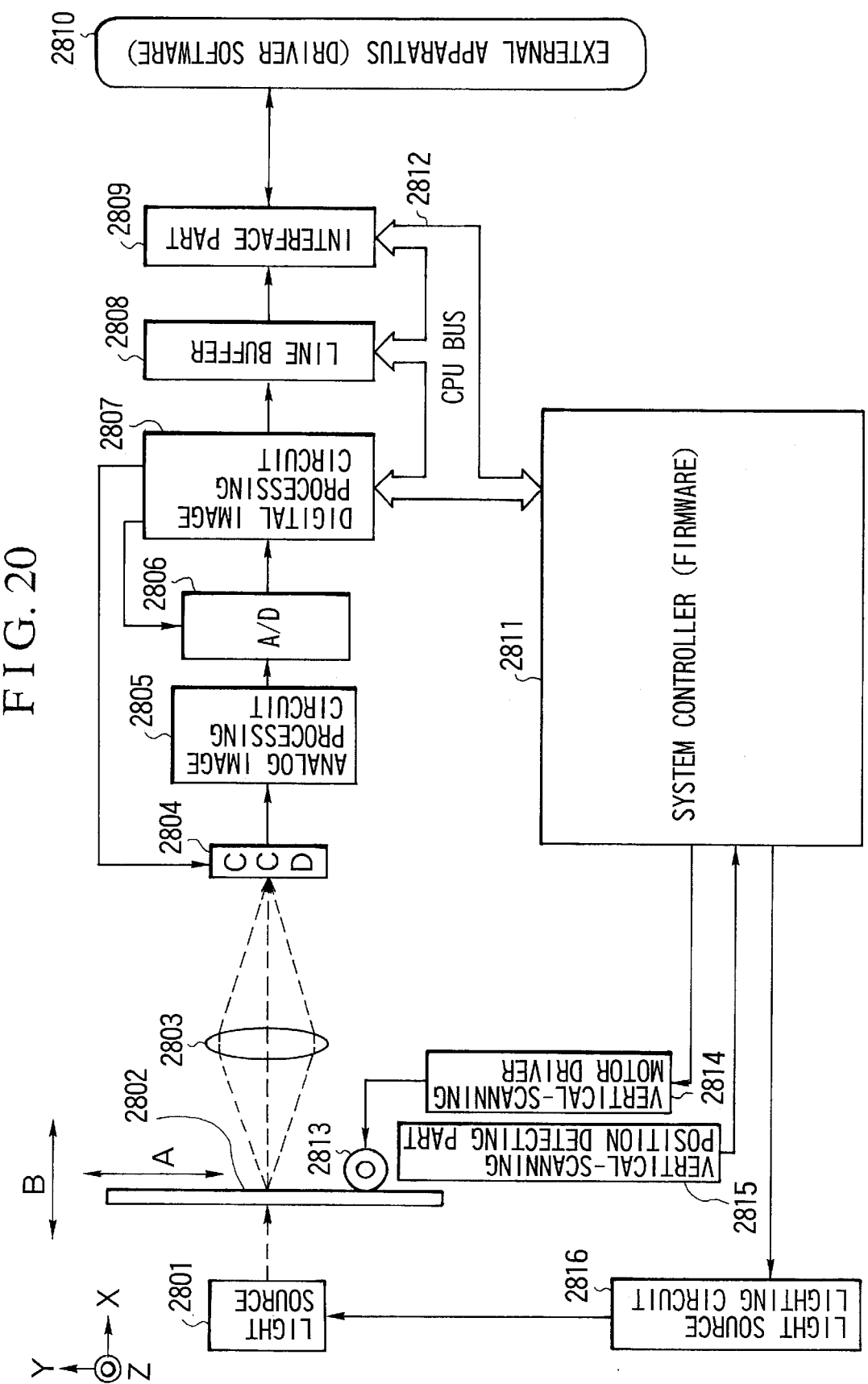
FIG. 20 is a block diagram showing the arrangement of the conventional film scanner.
Figure 21:
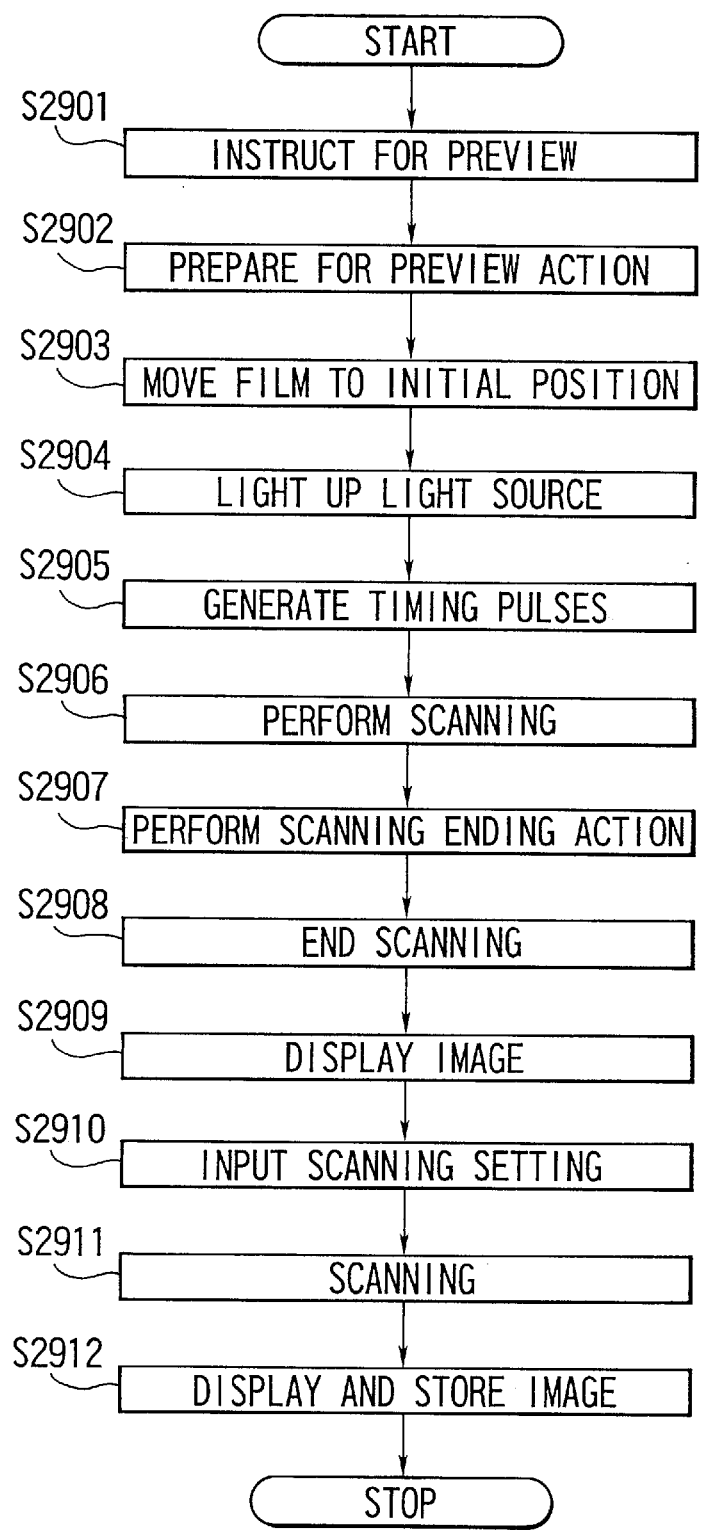
FIG. 21 is a flow chart showing steps of image reading processes of the conventional film scanner.

FIG. 19 is a flow chart showing the details of the film-type setting process at the step S2108 shown in FIG. 12 to be executed by the system controller 111. At a step S2701 in FIG. 19, information on the kind (negative or positive) of the film loaded is set. In the case of a negative film, one of groups divided by difference in density of negative base is set. Information on the film format indicating whether the film is of the 135 film format 135 or of the APS format is set. An amplification gain is switched from one predetermined gain over to another predetermined gain according to the setting.

At a step S2702, an exposure time is switched from one value over to another according to whether the film is a negative or positive film and, if it is a negative film, also according to its density. At a step S2703, a gamma correction table suited for the film type (kind) set is stored in the offset RAM 122. At a step S2704, a masking coefficient suited for the film type is set. At a step S2705, a standard image reading range is set if the film loaded is of the 135 film format or an image reading range is set according to a photo-taking mode if the film loaded is of the APS format. The film-type setting routine then comes to an end.

The arrangement for setting an image reading range according to the type or kind of the film relieves the user from troublesome trimming work. Further, the arrangement for changing the signal processing area according to the type of film eliminates any useless signal processing process, so that the length of time required for processing signals can be shortened.

As described above, a film scanner or an image reading apparatus according to the invention comprises holding means for holding a film original, an image sensor arranged to pick up an image from the film original held by the holding means, a lens arranged to form on the image sensor an image of light having passed through the film original, fixing means for keeping a distance between the image sensor and the lens constant, and focus adjusting means for adjusting focus by moving the fixing means with respect to the film original.

With the arrangement of the invention in the above manner, the focus on the film original to be read is adjusted by moving the fixing means which fixes the image forming lens and the image sensor thereto. Therefore, even when the position of the film original to be read varies with the format of the film, a focusing action can be carried out without imposing a mechanical load. Further, the arrangement for having a fixed distance between the image forming lens and the image sensor permits the focusing action to be carried out without varying the magnification of the lens. Further, the fixing means is arranged to be moved approximately in parallel with an image surface of the film original, so that a space available within the image reading apparatus can be efficiently utilized to permit reduction in size of the apparatus.

While the embodiments disclosed are arranged to read a film original, the invention is applicable also to a case where the image reading apparatus is to be used for reading a reflecting original, instead of reading a film original.

What is claimed is:

1. An image reading apparatus comprising:
    holding means for holding an original;
    a line image sensor for picking up the original held by said holding means;
    a lens for forming light from the original on said line image sensor,
    fixing means for keeping a distance between said line image sensor and said lens constant; and
    focus adjusting means for adjusting focus by moving said fixing means with respect to the original;
    wherein said fixing means is provided with a slit formed between said lens and said line image sensor for passing a less quantity of light to be imaged on the central part of said line image sensor and a larger quantity of light to be imaged on the peripheral parts of said line image sensor.

2. An image reading apparatus according to claim 1, wherein said holding means is detachably attached to a casing, and wherein said fixing means is held by said casing through a bayonet structure in such a way as to be slidable approximately in parallel with an optical axis of said lens and is in a box-like shape having an opening part which opens in a direction of mounting said casing.

3. An image reading apparatus according to claim 1, wherein said holding means is capable of holding each of a plurality of kinds of film originals.

4. An image reading apparatus according to claim 1, wherein said holding means is capable of holding at least one of a slide-mount film, a sleeve-shaped film and a roll-shaped long film.

5. An image reading apparatus according to claim 1, further comprising control means for controlling said focus adjusting means to reciprocate said fixing means so as to detect a focus position while said line image sensor is picking up a same position of said original, and after that for controlling said focus adjusting means to move said fixing means forward while said line image sensor is picking up the same position of said original so as to stop at the focus position.

6. An image reading apparatus according to claim 1, wherein said image sensor is a line sensor.

7. An image reading apparatus according to claim 6, further comprising control means for controlling said focus adjusting means to adjust focus by using an image signal outputted from picture elements in a middle part of said line sensor.

8. An image reading apparatus according to claim 6, wherein said moving means causes said holding means to make a reciprocating motion, and further comprising control means for obtaining exposure correction data during a forward movement of said holding means by said moving means and for causing said focus adjusting means to adjust focus during a backward movement of said holding means by said moving means.

9. An image reading apparatus according to claim 8, wherein said control means causes said focus adjusting means to adjust focus at an approximately central position of the original during the backward movement of said holding means by said moving means.

10. An image reading apparatus according to claim 1, wherein said focus adjusting means adjusts focus by moving said fixing means approximately in parallel with an image surface of the original.

11. An image reading apparatus according to claim 1, further comprising moving means for moving said holding means with respect to said fixing means.

12. An image reading apparatus according to claim 1, wherein said fixing means is provided with a cam groove which engages an eccentric shaft, and is caused to make a reciprocating motion by a rotation of said eccentric shaft.

13. An image reading apparatus according to one of claims 1 to 12, further comprising control means for controlling said focus adjusting means to make a reciprocating motion in such a way as to detect a focus position when the reciprocating motion is made for the first time and, during the next forward movement, stop at the focus position detected during the reciprocating motion.

\* \* \* \* \*

UNITED STATES PATENT AND TRADEMARK OFFICE
CERTIFICATE OF CORRECTION

PATENT NO. : 6,404,515 B1
DATED : June 11, 2002
INVENTOR(S) : Yoshinari Onda et al.

It is certified that error appears in the above-identified patent and that said Letters Patent is hereby corrected as shown below:

Title page,
Item [73], delete "Kubushiki" and insert -- Kabushiki --.

Column 3,
Line 3, delete "82910" and insert -- S2910 --.

Column 8,
Line 60, delete "32002" and insert -- S2002 --.
Line 61, delete "82007" and insert -- S2007 --.

Column 9,
Line 1, delete "52003" and insert -- S2003 --.
Lines 6 and 9, delete "82004" and insert -- S2004 --.
Line 11, delete "52010" and insert -- S2010 --.
Line 43, delete "52103" and insert -- S2103 --.
Line 48, delete "rip step 62105" and insert -- step S2105 --.
Line 51, delete "62105" and insert -- S2105 --.
Lines 53 and 54, "62106" and insert -- S2106 --.
Line 53, delete "62107" and insert -- S2107 --.
Lines 58 and 59, delete "62108" and insert -- S2108 --.
Line 63, delete "62112" and insert -- S2112 --.

Column 10,
Line 1, delete "52301" and insert -- S2301 --.
Line 5, delete "52302" and insert -- S2302 --.
Line 22, delete "32304" and insert -- S2304 --.
Line 27, delete "52308" and insert -- S2308 --.

Column 11,
Line 34, delete "32403" and insert -- S2403 --.
Line 45, delete "52404" and insert -- S2404 --.
Line 65, delete "52501" and insert -- S2501 --.

UNITED STATES PATENT AND TRADEMARK OFFICE
CERTIFICATE OF CORRECTION

PATENT NO.    : 6,404,515 B1
DATED         : June 11, 2002
INVENTOR(S)   : Yoshinari Onda et al.

It is certified that error appears in the above-identified patent and that said Letters Patent is hereby corrected as shown below:

Column 12,
Line 11, delete "52505" and insert -- S2505 --.

Signed and Sealed this

Twenty-eighth Day of October, 2003

JAMES E. ROGAN
*Director of the United States Patent and Trademark Office*